(12) United States Patent
Milana et al.

(10) Patent No.: US 12,393,849 B2
(45) Date of Patent: Aug. 19, 2025

(54) SYSTEM AND METHOD FOR GENERATING ULTIMATE REASON CODES FOR COMPUTER MODELS

(71) Applicant: Opera Solutions U.S.A., LLC, Jersey City, NJ (US)

(72) Inventors: Joseph Milana, San Diego, CA (US); Yonghui Chen, San Diego, CA (US); Lujia Chen, Shanghai (CN); Weiqiang Wang, San Diego, CA (US)

(73) Assignee: ElectrifAi, LLC, Jersey City, NJ (US)

( * ) Notice: Subject to any disclaimer, the term of this patent is extended or adjusted under 35 U.S.C. 154(b) by 1265 days.

(21) Appl. No.: 16/511,743

(22) Filed: Jul. 15, 2019

(65) Prior Publication Data

US 2019/0340514 A1    Nov. 7, 2019

Related U.S. Application Data

(63) Continuation of application No. 14/209,135, filed on Mar. 13, 2014, now abandoned.

(60) Provisional application No. 61/786,010, filed on Mar. 14, 2013.

(51) Int. Cl.
*G06N 5/00* (2023.01)

(52) U.S. Cl.
CPC .................................. *G06N 5/00* (2013.01)

(58) Field of Classification Search
CPC ........ G06N 99/005; G06N 5/04; G06N 7/005; G06N 7/00; G06N 5/025; G06K 9/6256; G06K 9/6269
See application file for complete search history.

(56) References Cited

U.S. PATENT DOCUMENTS

| | | | | |
|---|---|---|---|---|
| 5,819,226 A | * | 10/1998 | Gopinathan | G06Q 20/40 705/44 |
| 7,788,195 B1 | * | 8/2010 | Subramanian | G06N 20/00 706/20 |
| 8,296,257 B1 | * | 10/2012 | Chavira | G06F 16/35 706/62 |
| 2009/0018026 A1 | * | 1/2009 | Kim | G01N 33/57446 506/7 |

* cited by examiner

*Primary Examiner* — Luis A Sitiriche
(74) *Attorney, Agent, or Firm* — Nutter McClennen & Fish LLP

(57) ABSTRACT

A system and method for generating ultimate reason codes for computer models is provided. The system for generating ultimate reason codes for computer models comprising a computer system for receiving a data set, and an ultimate reason code generation engine stored on the computer system which, when executed by the computer system, causes the computer system to train a base model with a plurality of reason codes, wherein each reason code includes one or more variables, each of which belongs to only one reason code, train a subsequent model using a subset of the plurality of reason codes, determine whether a high score exists in the base model, determine a scored difference if a high score exists in the base model, and designate a reason code having a largest drop of score as an ultimate reason code.

15 Claims, 4 Drawing Sheets

SYSTEM AND METHOD FOR GENERATING ULTIMATE REASON CODES FOR COMPUTER MODELS

CROSS-REFERENCE TO RELATED APPLICATION

This patent application is a continuation of, and therefore claims priority from, U.S. patent application Ser. No. 14/209,135 entitled System and Method for Generating Ultimate Reason Codes for Computer Models filed Mar. 13, 2014, which claims the benefit of U.S. Provisional Patent Application No. 61/786,010 filed on Mar. 14, 2013, each of which is hereby incorporated herein by reference in its entirety.

BACKGROUND

Field of the Disclosure

The present disclosure relates generally to a system and method for providing reason codes by training a series of computer models. More specifically, the present disclosure relates to a system and method for generating ultimate reason codes for computer models.

Related Art

Currently, for big data applications, clients typically require high performance models which are usually advanced complex models. In business (e.g., consumer finance and risk, health care, and marketing research), there are many non-linear modeling approaches (e.g., neural network, gradient boosting tree, ensemble model, etc.). At the same time, high score reason codes are often required for business reasons. One example is in the fraud detection area where neural network models are used for scoring, and reason codes are provided for investigation.

There are different techniques to provide reason codes for non-linear complex models in the big data industry. Many methods utilize a single base model by computing the derivative of input reasons (e.g., the impact of a particular input variable on the model score), which is similar to sensitivity analysis approximation. Some other methods apply approximation of the scoring model to compute reasons. All of them are based on a single model, with the assumption that by modifying the input without retraining, the score is still consistent with the probability of the target. In other words, one assumption of utilizing a single base model is that the probability consistency holds even if one input variable is knocked-out without retraining. This assumption does not necessary hold as each sub-model's parameters are not optimized by training, such as by maximum-likelihood (e.g., the knocked-out model is not retrained).

SUMMARY

The system and method of the present disclosure generates ultimate reason codes for high score records in real time. The system utilizes a four-step approach to identify reason codes for high score records in real time in production. The system provides ultimate reasons for the first reason based on assumptions and results. The system can provide any arbitrary number of reason codes by approximation.

The system for generating ultimate reason codes for computer models comprising a computer system for receiving a data set, and an ultimate reason code generation engine stored on the computer system which, when executed by the computer system, causes the computer system to train a base model with a plurality of reason codes, wherein each reason code includes one or more variables, each of which belongs to only one reason code, train a subsequent model using a subset of the plurality of reason codes, determine whether a high score exists in the base model, determine a scored difference if a high score exists in the base model, and designate a reason code having a largest drop of score as an ultimate reason code.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a system and method for generating ultimate reason codes for computer models, as discussed in detail below in connection with FIGS. 1-5. The system can be used as an add-on package for any individual classification product to provide reason codes. The system could be an individual product for model deployment, and could be sold to any industries/companies requiring high performance analytics models, as well as robust reasons. The system could be used internally to provide services to customers (e.g., credit issuers, and credit bureau), and could be applied to various applications (e.g., health care, collections, marketing, etc.). The system and method of the present disclosure provides ultimate reason codes based on both solid assumptions and experimental results. By the term "ultimate reason code," it is mean a final reason code for a particular data set being modeled by a computer model, driven by the relationships within the data and not by the specific model.

Figure 1:
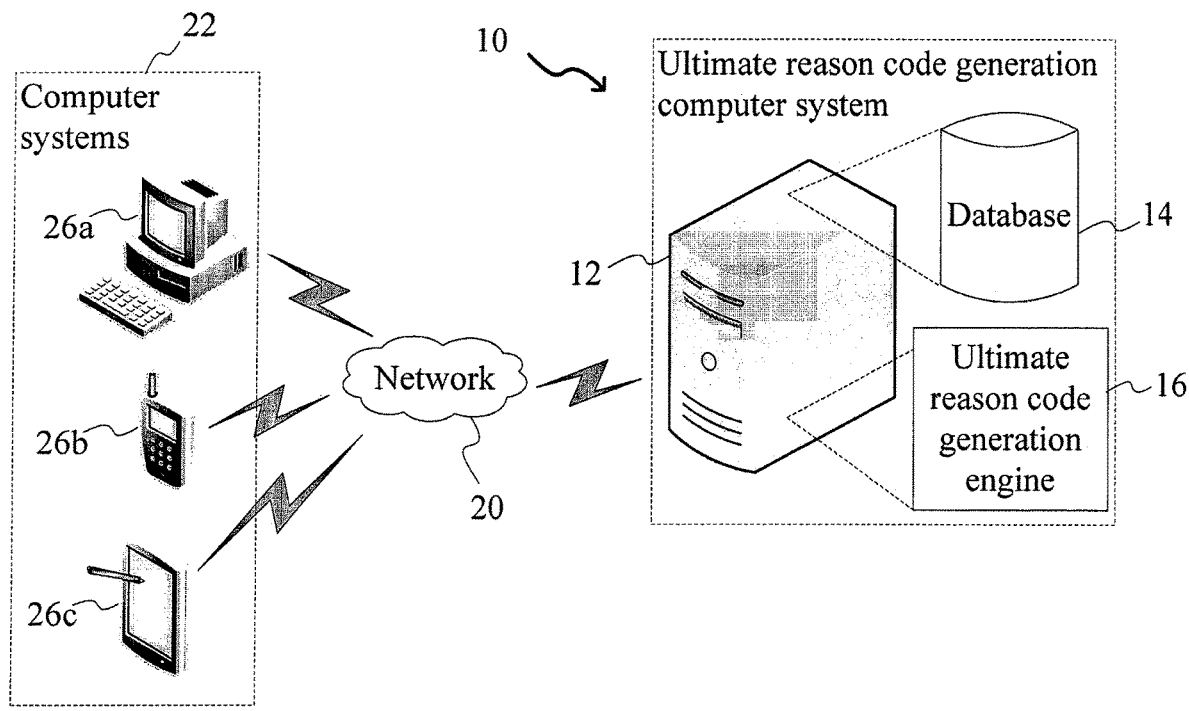
FIG. 1 is a diagram illustrating the system of the present disclosure.

FIG. 1 is a diagram showing a system for generating ultimate reason codes for computer models, indicated generally at 10. The system 10 comprises a computer system 12 (e.g., a server) having a database 14 stored therein and ultimate reason code generation engine 16. The computer system 12 could be any suitable computer server (e.g., a server with an INTEL microprocessor, multiple processors, multiple processing cores) running any suitable operating system (e.g., Windows by Microsoft, Linux, etc.). The database 14 could be stored on the computer system 12, or located externally (e.g., in a separate database server in communication with the system 10).

The system 10 could be web-based and remotely accessible such that the system 10 communicates through a network 20 with one or more of a variety of computer systems 22 (e.g., personal computer system 26a, a smart cellular telephone 26b, a tablet computer 26c, or other devices). Network communication could be over the Internet using standard TCP/IP communications protocols (e.g., hypertext transfer protocol (HTTP), secure HTTP (HTTPS), file transfer protocol (FTP), electronic data interchange (EDI), etc.), through a private network connection (e.g., wide-area network (WAN) connection, emails, electronic data interchange (EDI) messages, extensible markup language (XML) messages, file transfer protocol (FTP) file transfers, etc.), or any other suitable wired or wireless electronic communications format.

The reason code generation system and method of the present disclosure is utilized to provide "ultimate" reason codes based on a few assumptions described below. A neural network (NN) fraud detection model is used with a dataset as an example. An NN trained with Mean Squared Error will approach the posteriori probability P(Bad|x) for a binary outcome, which is validated by results described in more detail below. Ultimate reason code technology is used to identify an arbitrary number of reason codes by retraining a group of sub models with individual knocked-out reasons.

Figure 2:
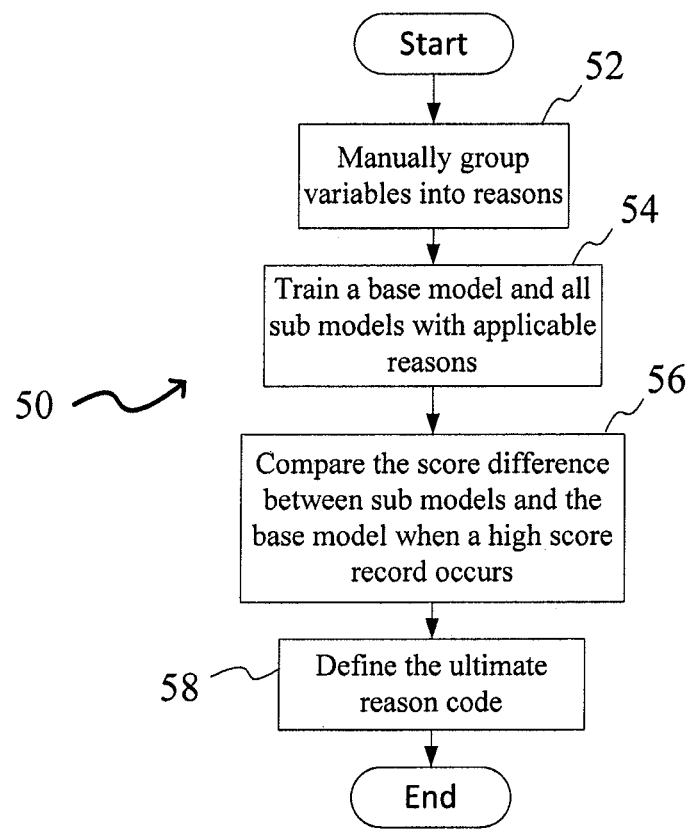
FIG. 2 illustrates processing steps carried out by the system of the present disclosure.

FIG. 2 illustrates processing steps 50 of the system of the present disclosure. In step 52, variables are grouped into reasons manually. A reason can contain one or more variables, and a single variable belongs to only one reason. It is difficult to automate this process as it usually involves expert knowledge of the data, the domain, and the variables. In the examples discussed below this step is skipped to avoid human intervention. Thus, every reason contains only one variable and every variable is a unique reason. In step 54, a base model, M_0, is trained with all of the reasons (e.g., N). Subsequent N models (M_1, M_2, ..., M_N) are trained by removing each reason at a time. For example, M_1 will be trained on the same data with reasons (R_2, R_3, ..., R_N), and without R_1. In step 56, when a high score record occurs in a base model, the score difference between S_0 and (S_1, S_2, ..., S_N) are compared. In step 58, the knocked-out reason with the largest drop of score, max (S_0-S_N), is defined as the ultimate reason code. If more than one reason code is needed, the next largest drop reason is defined, and so on. In production all N+1 models (M_0, M_1, ..., M_N) are deployed. For a high score record, all the N+1 scores, S_0, S_1, ..., S_N, are obtained. This only increases the overall running time by a small percentage.

This technique is based on a few assumptions, as described below. The first assumption is that the score is consistent with the probability of target for all the trained N+1 models. This is one of the properties for Neural Networks (as well as other model paradigms). As long as there is enough sample data, and the model is trained well enough, the final score should converge on the probability of the target (validated in examples below). A second assumption is that all of the N+1 models are consistent between training data and production data. This can be monitored by the score distributions of all of the N+1 models. If any inconsistency happens in any one model, the model should be retrained. Statistically this assumption holds but there can be some standard errors causing outliers, which could be in statistical range. The third assumption is that compared to the original model M_0, each sub-model M_k (1⇐k⇐N) has a lower score for a suspicious record due to missing information from the knocked-out reason. As shown in the results below, the score decreases for nearly all high-score transactions in knocked-out models. There are rare cases that all sub-models have higher scores than the original. This is due to statistical fluctuations affecting the original model. In this scenario, the knocked-out reason in the smallest-score model would be chosen as the first reason code.

Figure 3:
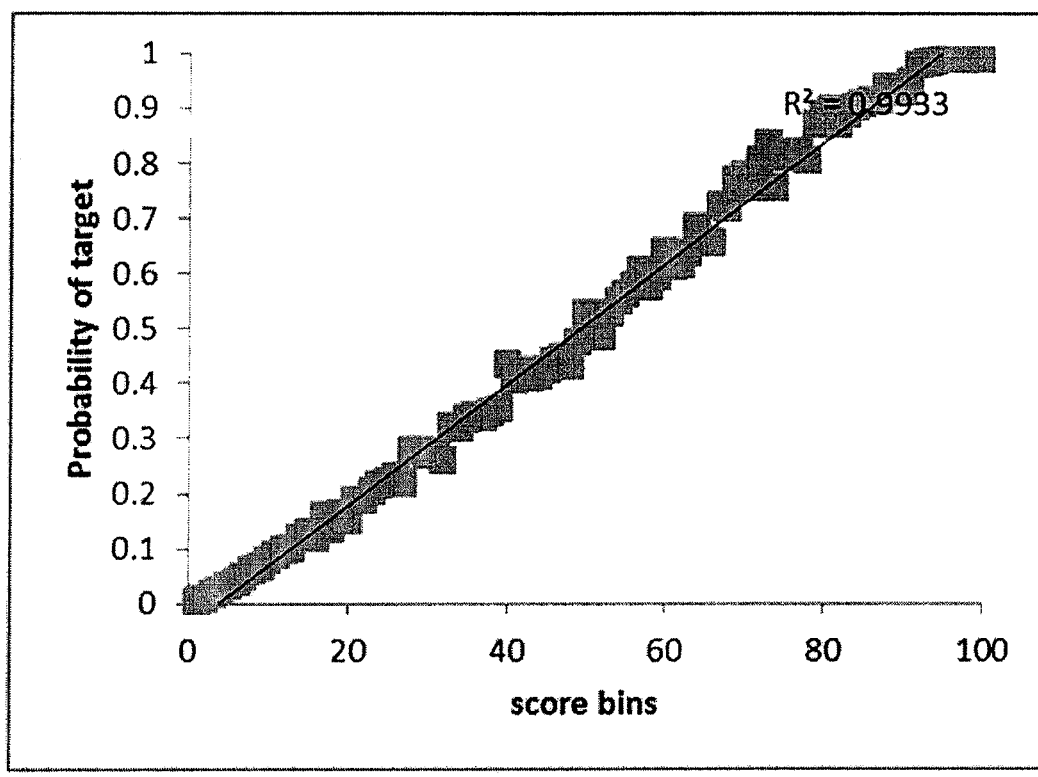
FIG. 3 is a graph illustrating a score generated by the system in proportion to the probability of the target.

FIG. 3 is a graph illustrating a score in proportion to the probability of the target. In this example, the base model M_0 was used to validate the assumption that the score is consistent with the probability of target. The data was from a dataset and the targets were the frauds. A three-layer neural network model was trained with 30 input variables. The X axis represents the scores in 100 bins, where score 0.87 corresponds to bin 87. The Y axis represents the probability of the target. As shown, the score was very consistent with the probability of target, with R-square close to 1.

Figure 4:
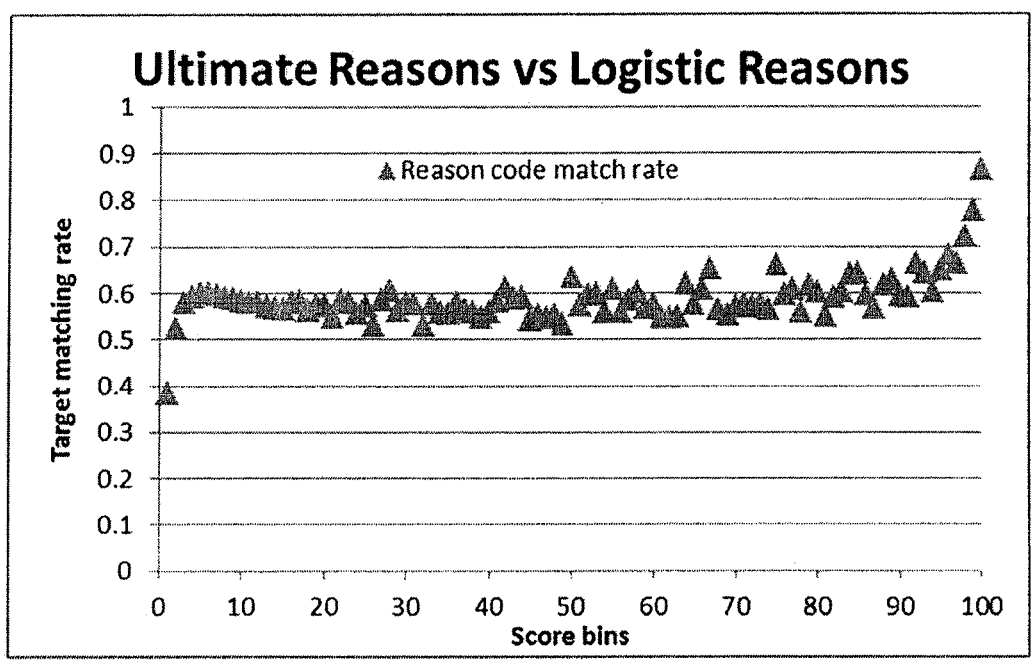
FIG. 4 is a graph comparing ultimate reasons generated by the system with logistic regression reasons.

FIG. 4 is a graph comparing ultimate reasons with logistic regression reasons. Logistic regression models are often used in production since the weights are usually explainable and because the score is intended to be interpreted as a probability. In this example, the first ultimate reason was compared with the first reason generated by logistic regression. The general approach for determining the logistic regression reasons is to assign the relevance of each input variable to the overall score generated by the model. The reason codes are then ranked based on the relevance. The first logistic regression reason is the variable (first reason) $x_i$ with coefficient $\beta_i$ introducing the maximal deviation of the product $x_i\beta_i$ from average value $x_i^0\beta_i$. After ranking, the top few (e.g., 3 or 4) reason codes were selected. The X axis represents the score bins and the Y axis represents the first reason code matching rate between ultimate reasons and logistic regression in each score bin. As shown, the first reason matches well in most score bins. In high score bins above 95, the matching rate increases significantly.

Information related to the present disclosure includes (1) http://en.wikipedia.org/wiki/Maximum_likelihood, (2) M D Richard, et al., "Neural network classifiers estimate Bayesian a-posteriori probabilities," Neural Computation, 3(4): 461-483 (1991), and (3) Yonghui Chen, et al., "System and method for developing proxy model," U.S. Provisional Patent No. 61/759,682, the disclosures of which are incorporated herein by reference.

Figure 5:
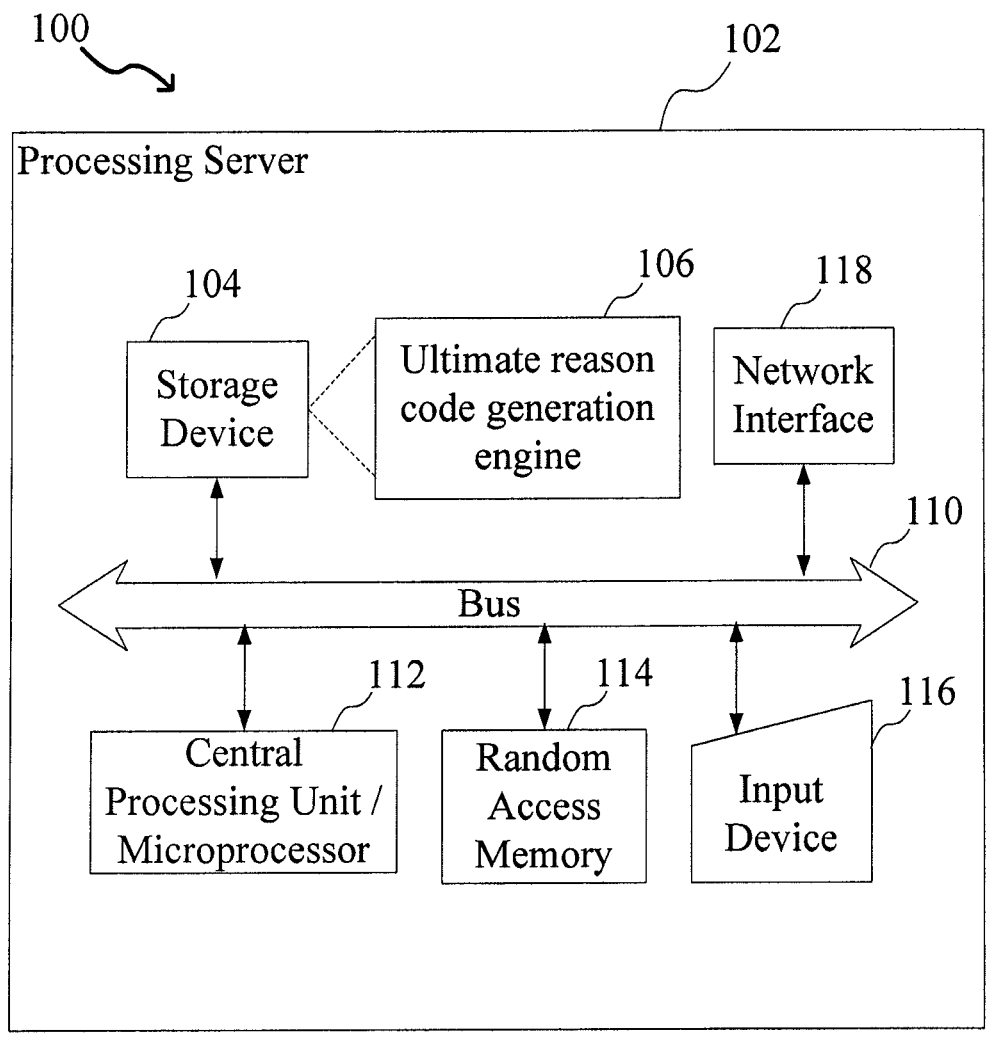
FIG. 5 is a diagram showing hardware and software components of the system.

FIG. 5 is a diagram showing hardware and software components of a computer system 100 on which the system of the present disclosure could be implemented. The system 100 comprises a processing server 102 which could include a storage device 104, a network interface 108, a communications bus 110, a central processing unit (CPU) (microprocessor) 112, a random access memory (RAM) 114, and one or more input devices 116, such as a keyboard, mouse, etc. The server 102 could also include a display (e.g., liquid crystal display (LCD), cathode ray tube (CRT), etc.). The storage device 104 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The server 102 could be a networked computer system, a personal computer, a smart phone, tablet computer etc. It is noted that the server 102 need not be a networked server, and indeed, could be a stand-alone computer system.

The functionality provided by the present disclosure could be provided by an ultimate reason code generation program/engine 106, which could be embodied as computer-readable program code stored on the storage device 104 and executed by the CPU 112 using any suitable, high or low level computing language, such as Python, Java, C, C++, C#, .NET, MATLAB, etc. The network interface 108 could include an Ethernet network interface device, a wireless network interface device, or any other suitable device which permits the server 102 to communicate via the network. The CPU 112 could include any suitable single- or multiple-core microprocessor of any suitable architecture that is capable of implementing and running the ultimate reason code generation program 106 (e.g., Intel processor). The random access memory 114 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected is set forth in the following claims.

What is claimed is:

1. A system for generating ultimate reason codes for computer models comprising:
    a computer system for receiving a data set;
    an ultimate reason code generation engine stored on the computer system which, when executed by the computer system, causes the computer system to:
    train a base model on a set of training data using a plurality of reason codes, wherein each reason code includes one or more variables, each of which belongs to only one reason code;
    train a plurality of subsequent models equal to the number of reason codes by removing a different reason code from the base model for each of the plurality of subsequent models so that each of the plurality of subsequent models is trained on the same set of training data as the base model but using a different subset of reason codes having one less reason code than the base model;
    determine a score in the base model;
    determine a score in each of the plurality of subsequent models;
    determine, for each of the plurality of subsequent models, a difference between the base model score and the subsequent model score, such difference representing a drop of score between the base model score and the subsequent model score; and
    designate as an ultimate reason code the reason code that was removed from the subsequent model having a largest drop of score.

2. The system of claim 1, further comprising designating as a second ultimate reason code the reason code that was removed from the subsequent model having a second largest drop of score.

3. The system of claim 2, wherein the ultimate reason codes are generated in real time.

4. The system of claim 1, further comprising obtaining, for a high score record, one or more scores from the base model and one of the plurality of subsequent models.

5. The system of claim 1, further comprising ranking the reason codes based on relevance.

6. A method for generating ultimate reason codes for computer models comprising:
    receiving a data set at a computer system;
    training a base model on a set of training data using a plurality of reason codes by an ultimate reason code generation engine stored on and executed by the computer system, wherein each reason code includes one or more variables, each of which belongs to only one reason code;
    training by the ultimate reason code generation engine a plurality of subsequent models equal to the number of reason codes by removing a different reason code from the base model for each of the plurality of subsequent models so that each of the plurality of subsequent models is trained on the same set of training data as the base model but using a different subset of reason codes having one less reason code than the base model;
    determining by the ultimate reason code generation engine a score in the base model;
    determining by the ultimate reason code generation engine a score in each of the plurality of subsequent models;
    determining by the ultimate reason code generation engine, for each of the plurality of subsequent models, a difference between the base model score and the subsequent model score, such difference representing a drop of score between the base model score and the subsequent model score; and
    designating by the ultimate reason code generation engine as an ultimate reason code the reason code that was removed from the subsequent model having a largest drop of score.

7. The method of claim 6, further comprising designating as a second ultimate reason code the reason code that was removed from the subsequent model having a second largest drop of score.

8. The method of claim 7, wherein the ultimate reason codes are generated in real time.

9. The method of claim 6, further comprising obtaining, for a high score record, one or more scores from the base model and one of the plurality of subsequent models.

10. The method of claim 6, further comprising ranking the reason codes based on relevance.

11. A non-transitory computer-readable medium having computer-readable instructions stored thereon which, when executed by a computer system, cause the computer system to perform the steps of:
    receiving a data set at the computer system;
    training a base model on a set of training data using a plurality of reason codes by an ultimate reason code generation engine stored on and executed by the computer system, wherein each reason code includes one or more variables, each of which belongs to only one reason code;
    training by the ultimate reason code generation engine a plurality of subsequent models equal to the number of reason codes by removing a different reason code from the base model for each of the plurality of subsequent models so that each of the plurality of subsequent models is trained on the same set of training data as the base model but using a different subset of reason codes having one less reason code than the base model;
    determining by the ultimate reason code generation engine a score in the base model;
    determining by the ultimate reason code generation engine a score in each of the plurality of subsequent models;
    determining by the ultimate reason code generation engine, for each of the plurality of subsequent models, a difference between the base model score and the subsequent model score, such difference representing a drop of score between the base model score and the subsequent model score; and designating by the ultimate reason code generation engine as an ultimate reason code the reason code that was removed from the subsequent model having a largest drop of score.

12. The computer-readable medium of claim 11, further comprising designating as a second ultimate reason code the reason code that was removed from the subsequent model having a second largest drop of score.

13. The computer-readable medium of claim 12, wherein the ultimate reason codes are generated in real time.

14. The computer-readable medium of claim 11, further comprising obtaining, for a high score record, one or more scores from the base model and one of the plurality of subsequent models.

15. The computer-readable medium of claim 11, further comprising ranking the reason codes based on relevance.

\* \* \* \* \*